(12) United States Patent
Ghosh et al.

(10) Patent No.: US 10,565,526 B2
(45) Date of Patent: *Feb. 18, 2020

(54) LABELING OF DATA FOR MACHINE LEARNING

(71) Applicant: International Business Machines Corporation, Armonk, NY (US)

(72) Inventors: Prasanta Ghosh, Bangalore (IN); Shantanu R. Godbole, Bangalore (IN); Sachindra Joshi, Gurgaon (IN); Srujana Merugu, Bangalore (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 15/654,750

(22) Filed: Jul. 20, 2017

(65) Prior Publication Data

US 2017/0316348 A1  Nov. 2, 2017

Related U.S. Application Data

(63) Continuation of application No. 14/296,797, filed on Jun. 5, 2014, now Pat. No. 9,747,555.

(51) Int. Cl.
*G06N 20/00* (2019.01)
*G06F 16/35* (2019.01)
(Continued)

(52) U.S. Cl.
CPC ............ *G06N 20/00* (2019.01); *G06F 16/35* (2019.01); *G06F 16/9024* (2019.01); *G06N 5/02* (2013.01)

(58) Field of Classification Search
None
See application file for complete search history.

(56) References Cited

U.S. PATENT DOCUMENTS

| 7,720,773 B2 | 5/2010 | Szummer et al. |
| 7,937,264 B2 | 5/2011 | Burges et al. |

(Continued)

FOREIGN PATENT DOCUMENTS

CA    2598923 A1    2/2008

OTHER PUBLICATIONS

Whitehill et al., "Whose Vote Should Count More: Optimal Integration of Labels from Labelers of Unknown Expertise", p. 2035, NIP2009 (Year: 2009).*

(Continued)

*Primary Examiner* — Li B. Zhen
*Assistant Examiner* — Tsu-Chang Lee
(74) *Attorney, Agent, or Firm* — Scott S. Dobson

(57) ABSTRACT

A computer generates labels for machine learning algorithms by retrieving, from a data storage circuit, multiple label sets that contain labels that each classify data points in a corpus of data. A graph is generated that includes a plurality of edges, each edge between two respective labels from different label sets of the multiple label sets. Weights are determined for the plurality of edges based upon a consistency between data points classified by two labels connected by the edges. An algorithm is applied that groups labels from the multiple label sets based upon the weights for the plurality of edges. Data points are identified from the corpus of data that represent conflicts within the grouped labels. An electronic message is transmitted in order to present the identified data points to entities for further classification. A new label set is generated using the further classification received from the entities.

7 Claims, 5 Drawing Sheets

(51) Int. Cl.
  *G06F 16/901* (2019.01)
  *G06N 5/02* (2006.01)

(56) References Cited

U.S. PATENT DOCUMENTS

| | | | |
|---|---|---|---|
| 8,484,016 | B2 | 7/2013 | Brockett et al. |
| 8,938,453 | B2 * | 1/2015 | Lewak .............. G06F 16/24573 707/737 |
| 2009/0132561 | A1 | 5/2009 | Cormode et al. |
| 2015/0356457 | A1 | 12/2015 | Ghosh et al. |
| 2015/0356459 | A1 | 12/2015 | Ghosh et al. |

OTHER PUBLICATIONS

Blum, et al., "Learning from Labeled and Unlabeled Data using Graph Mincuts", Jun. 2001, Research Showcase, Carnegie Mellon University (Year: 2001).*

Seong, et al., "Incremental Clustering of Attributed Graphs", in IEEE Trans. on Systems, Man, and Cybernetics, vol. 23, No. 5, Sep./Oct. 1993 (Year: 1983).*

Decker, Distributed Problem-Solving Techniques: A Survey, IEEE Trans. on Systems, Man, and Cybernetics, vol. SMC-17, No. 5, Sep./Oct. 1987 (Year: 1987).*

Dawyndt, et al., "Knowledge Accumulation and Resolution of Data Inconsistencies during the Integration of Microbial Information Sources", IEEE Tran. on Knowledge and Data Engineering, vol. 17, No. 8, Aug. 2005 (Year: 2005).*

Ruta, et al., "An Overview of Classifier Fusion Methods", in Computing and Information Systems, 7 (2000) p. 1-10 (Year: 2000).*

Ipeirotis, et al., "Repeated labeling using multiple noisy labelers", in Data Min. Knowl. Disc. (2014) 28:402-441, published online:Mar. 16, 2013 (Year: 2013).*

Gao, et al., "Graph-based Consensus Maximization among Multiple Supervised and Unsupervised Models", p. 585 in NIP2009 (Year : 2009).*

Alvarez-Garcia et al., "GraphGen: A Tool for Automatic Generation of Multipartite Graphs from Arbitrary Data," 2012 Eighth Latin American Web Congress, Oct. 25-27, 2012, pp. 87-94, Cartagena de Indias, © 2012 IEEE D.O.I. 10.1109/LA-WEB.2012.15.

IBM, List of IBM Patents or Patent Applications Treated as Related. Dated Jul. 17, 2017, 2 pages.

Bengio et al., "Advances in Neural Information Processing Systems 22", Proceedings of the 2009 Conference, copyright 2009 NIPS Foundation, 45 pages. http://books.nips.cc/nips22.html.

Ruta et al., "An Overview of Classifier Fusion Methods", Computing and Information Systems, 7, 2000, Copyright 2000 University of Paisley, 10 pages.

Dawyndt et al., "Knowledge Accumulation and Resolution of Data Inconsistencies during the Integration of Microbial Information Sources", IEEE Transaction of Knowledge and Data Engineering, vol. 17, No. 8, Aug. 2005, 16 pages.

Decker, K., "Distributed Problem-Solving Techniques: A Survey", IEEE Transactions on Systems, Man, and Cybernetics, vol. SMC-17, No. 5, Sep./Oct. 1987, 12 pages.

Seong et al., "Incremental Clustering of Attributed Graphs", IEEE Transactions on Systems, Man, and Cybernetics, vol. 23, No. 5, Sep./Oct. 1993, 13 pages.

Blum et al., "Learning from Labeled and Unlabeled Data using Graph Mincuts", Carnegie Mellon University, Research Showcase @ CMU, Computer Science Department, 2001, 9 pages.

Whitehill et al., "Whose Vote Should Count More: Optimal Integration of Labels from Labelers of Unknown Expertise", Machine Perception Laboratory, University of California, San Diego, NIP2009, 9 pages.

Ipeirotis et al., "Repeated labeling using multiple noisy labelers", Data Min Knowl Disc (2014), Received Sep. 2010, Published online Mar. 2013, 40 pages. DOI: 10.1007/s10618-013-0306-1.

Gao et al., "Graph-based Consensus Maximization among Multiple Supervised and Unsupervised Models", University of Illinois Urbana-Champaign, IL, BIM TJ Watson Research Center, Hawthorn, NY, NIP2009, 9 pages.

* cited by examiner

LABELING OF DATA FOR MACHINE LEARNING

BACKGROUND

The present disclosure relates to labeling data points for machine learning, and more specifically, to creating a label set based upon multiple candidate label sets.

Machine learning algorithms allow computer systems to solve a variety of problems, answer questions and perform other tasks based not solely upon pre-programmed instructions, but also upon inferences developed from a source, or corpus, of data. The corpus of data can be used to train the machine learning algorithm(s) by creating representations and generalizations that can then be applied to additional data in the future. How effectively a machine learning algorithm can be trained can be limited by how well the data is classified or labelled before it is used in a training procedure.

SUMMARY

Consistent with certain embodiments, a computer implemented method is used to generate labels for machine learning algorithms. The method includes retrieving, from a data storage circuit, multiple label sets that contain labels that each classify data points in a corpus of data; generating a graph that includes a plurality of edges, each edge between two respective labels from different label sets of the multiple label sets; determining weights for the plurality of edges based upon a consistency between data points classified by two labels connected by the edges; applying an algorithm that groups labels from the multiple label sets based upon the weights for the plurality of edges; identifying data points from the corpus of data that represent conflicts within the grouped labels; transmitting an electronic message for presenting the identified data points to entities for further classification; and generating a new label set based upon the grouped labels and further classification received from the entities.

According to embodiments, a computer system can generate labels for machine learning algorithms. The computer system can include at least one processor circuit and computer readable storage device that are configured to include a label set comparison module configured to: retrieve, from a data storage circuit, multiple label sets that contain labels that each classify data points in a corpus of data; generate a graph that includes a plurality of edges, each edge between two respective labels from different label sets of the multiple label sets; determine weights for the plurality of edges based upon a consistency between data points classified by two labels connected by the edges. The system can also include a label set coordinator module configured to: apply an algorithm that groups labels from the multiple label sets based upon the weights for the plurality of edges; and identify data points from the corpus of data that represent conflicts within the grouped labels. The system can further include a label set issue handler module configured to: transmit an electronic message for presenting the identified data points to entities for further classification; and generate a new label set based upon the grouped labels and further classification received from the entities.

Embodiments are directed toward a computer program product that includes a computer readable storage medium having program instructions embodied therewith, the program instructions executable by a computer to cause the computer to perform a method that includes: retrieving, from a data storage circuit, multiple label sets that contain labels that each classify data points in a corpus of data; generating a graph that includes a plurality of edges, each edge between two respective labels from different label sets of the multiple label sets; determining weights for the plurality of edges based upon a consistency between data points classified by two labels connected by the edges; applying an algorithm that groups labels from the multiple label sets based upon the weights for the plurality of edges; identifying data points from the corpus of data that represent conflicts within the grouped labels; transmitting an electronic message for presenting the grouped data points to entities for further classification; and generating a new label set based upon the grouped labels and further classification received from the entities.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
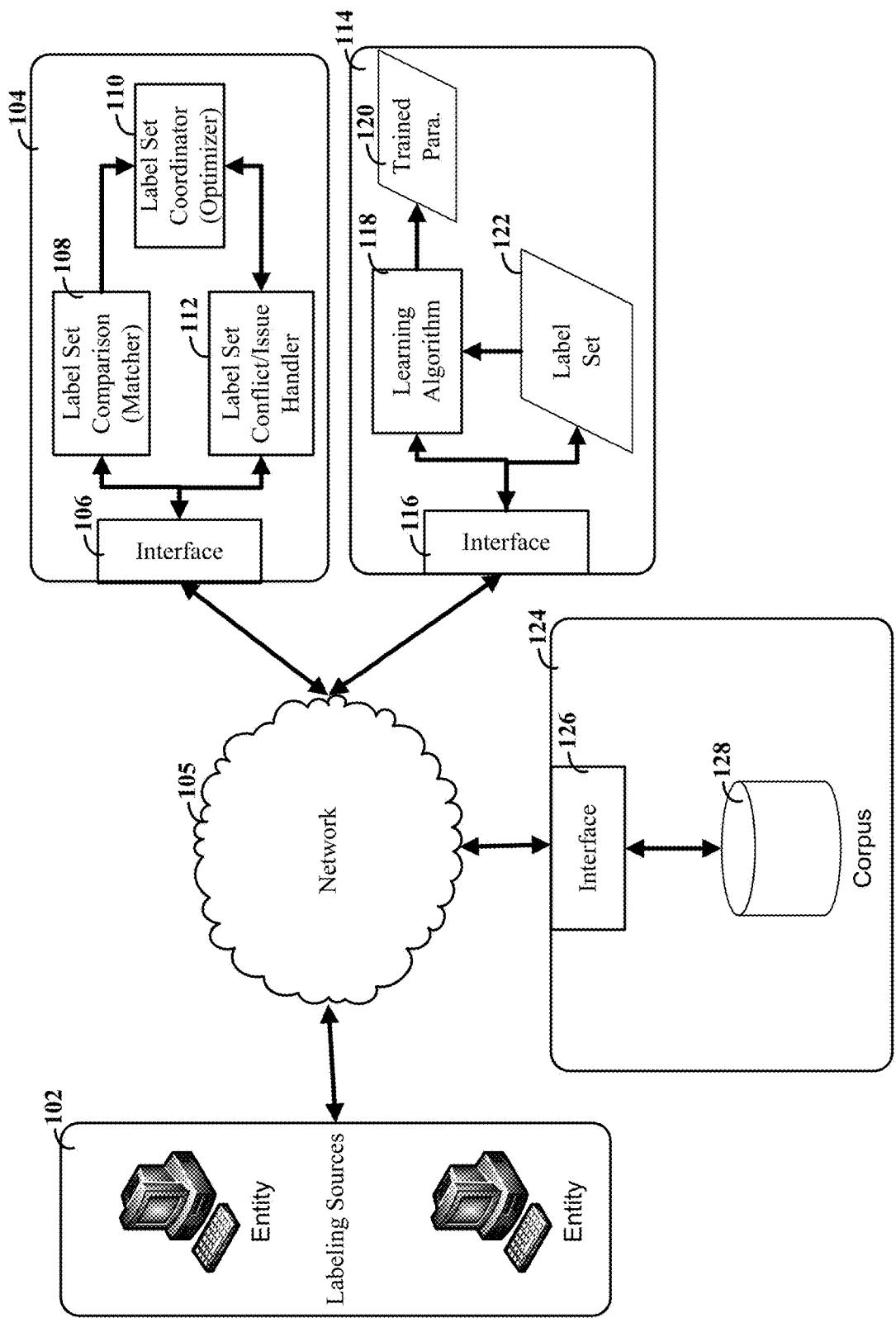
FIG. 1 depicts a system for generating a label set from a plurality of label sets, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to labeling data points for machine learning, more particular aspects relate to creating a consensus label set from a plurality of candidate label sets. While the present disclosure is not necessarily limited to such applications, various aspects of the disclosure may be appreciated through a discussion of various examples using this context.

Consistent with embodiments of the present disclosure, a machine learning algorithm can be trained from a corpus of available data that has data points that have been categorized or labelled. The labeling of the data points can be based upon input from multiple different individuals or entities, which can help to protect against biases of any particular individual or entity. For instance, labeling of data can be affected by the specialties, experience and knowledge of the specific individual. Aspects of the present disclosure are based upon the recognition that differences in labeling can lead to multiple label sets with relevant differences in how data points are classified. Accordingly, a computer system can be configured to analyze and process multiple label sets in order to generate a consensus label set that considers and coordinates input from multiple entities.

According to certain embodiments, a computer system can be configured to generate an electronic message that identifies specific issues with creating a consensus label set. This electronic message can be provided to the labeling entities so that they can provide additional information. This additional information can then be used by the computer system to resolve outstanding issues and to generate a label set for the corpus of data. The label set and corpus of data can then be used to train a machine learning algorithm. The trained machine learning algorithm can then be used in connection with other data to solve problems, answer questions, identify salient aspects from the other data, or other functions.

Particular embodiments are directed toward the creation of a graph from the multiple different label sets. The graph can include edges that connect labels in different label sets. The computer system can be configured to assign weights to the edges based upon similarities between data points classified within each label. For instance, more weight can be given to an edge connecting two labels with many common data points than to an edge connecting two labels with fewer common data points. The computer system can be configured to identify and group labels based upon the edge weights. For instance, the computer system can apply an optimization algorithm that attempts to maximize edge weights by selecting and grouping labels from each of the label sets based upon their connecting edges.

After labels have been selected from the multiple label sets, the computer system can be configured to identify issues with using the selected label set, e.g., using the label set to classify the data points in the corpus of data. Examples of such issues can include a data point being classified in two mutually exclusive labels or a data point not being classified by any of the selected labels. The computer system can generate an electronic message to communicate the identified issues to the classifying entities. The classifying entities can then provide feedback that is used to resolve the issues. In this manner, the computer system can be configured to generate a new label set using the feedback to modify the previously identified label sets. The new/modified label set can then be used by the machine learning algorithm.

Turning now to the figures, FIG. 1 depicts a system for generating a label set from a plurality of label sets, consistent with embodiments of the present disclosure. Label sources (entities) 102, computer storage system 124, label set generating computer system 104 and machine learning computer system 114 can be connected to one another over one or more networks 105 by interfaces 106, 116 and 126 (e.g., connected by network interface cards, drivers and associated applications). The network 105 can include, but is not necessarily limited to, the global Internet, wide area networks (WAN), local area networks (LANs), public networks, private networks and combinations thereof. Computer systems discussed herein, including systems 104, 114 and 124, can include one or more computer processor circuits that are each configured to include various modules and perform the specific functions and algorithms described in the present disclosure (e.g., the system can be configured using hardware storage devices that store computer readable instructions relating to the various modules, functions and algorithms).

The system can be configured to generate a label set 122 that is used to train a learning algorithm 118. The training can be accomplished using a corpus of data stored in one or more databases 128. Entities 102 can have access to the corpus in order to generate respective label sets that classify data points within the corpus. As discussed herein, the use of multiple entities, each with a unique and different perspective, can be particularly useful for generating useful label sets. In part, the knowledge, experience and biases of each entity can lead to different generalizations, classifications and resulting labels. As an example, a research scientist may come up with a different label set for a corpus than an engineer for the same corpus. Using input from a large number of entities can help to lessen the impact of one-off classifications from individuals with strong biases or significantly different ideas for the label set.

The label sets from the labeling sources 102 can be provided to the label set coordination system 104 using one or more interface modules 106, which can be configured to communicate over network 105. A label set comparison (matcher) module 108 can be configured to compare the labels from the different label sets. For instance, the label set comparison module 108 can generate a graph that connects labels in different label sets with edges. Weighting can be applied to the edges based upon a comparison between data points within the connected labels.

According to embodiments, a label set coordinator (optimizer) module 110 can be configured to identify and group labels from the label sets based upon edge weights generated by the label set comparison module 108. For instance, the label set coordinator module 110 can attempt to identify labels by matching labels in different label sets in a manner that results in higher overall weight values. Thus, the identification can be conducted by applying one or more optimization algorithms to the graph and weighted edges. For instance, an optimization algorithm can select and match labels connected by edges that have high edge weights.

The identified labels can be provided to the label set conflict handler module 112, which can identify potential issues with the selected and matched labels. For instance, an optimization matching algorithm may result in one or more of the labels not being selected and in labels being matched in a manner that results in either data points not being in any selected label or being in two different matched (or grouped) sets of labels. The label set conflict handler module 112 can identify such issues and generate an electronic message that informs labelling sources 102 of the issues and instructs them to provide feedback and suggestions on how resolve the issues.

Consistent with certain embodiments, the electronic message can be sent to each entity and each entity can provide separate and independent feedback and suggestions. The label set conflict handler module 112 can look for consensus between the entities and update the selected labels accordingly. For example, a consensus may be determined when a threshold percentage of entities are in agreement on how to solve a particular issue (e.g., where to place a data point not in a selected label or in which label(s) to remove a data point that is in multiple labels). For issues without a consensus, the competing suggestions can be used to generate a new electronic message so that the entities can review and reconsider. This iterative process can be repeated until a consensus is reached or some other threshold is reached, such as a set number of iterations or a lack of significant improvement between iterations.

According to various embodiments, the electronic message can be provided using a collaborative interface, such as a webpage or forum that allows the entities to discuss and share thoughts on how to resolve the issues. This can include one or more of polling or voting options, online forums for posting text and other information, instant messaging, email exchanges and other forms of communication.

Once a consensus label set is created, the label set can be used to train a machine learning algorithm. For example, a computer system 114 can train a machine learning algorithm 118 using a label set 122 and data from the corpus 128, which can be provided using interface 116. An output from the training can include a set of trained parameters 120, which can help to define how the machine learning algorithm will analyze future data.

Figure 2:
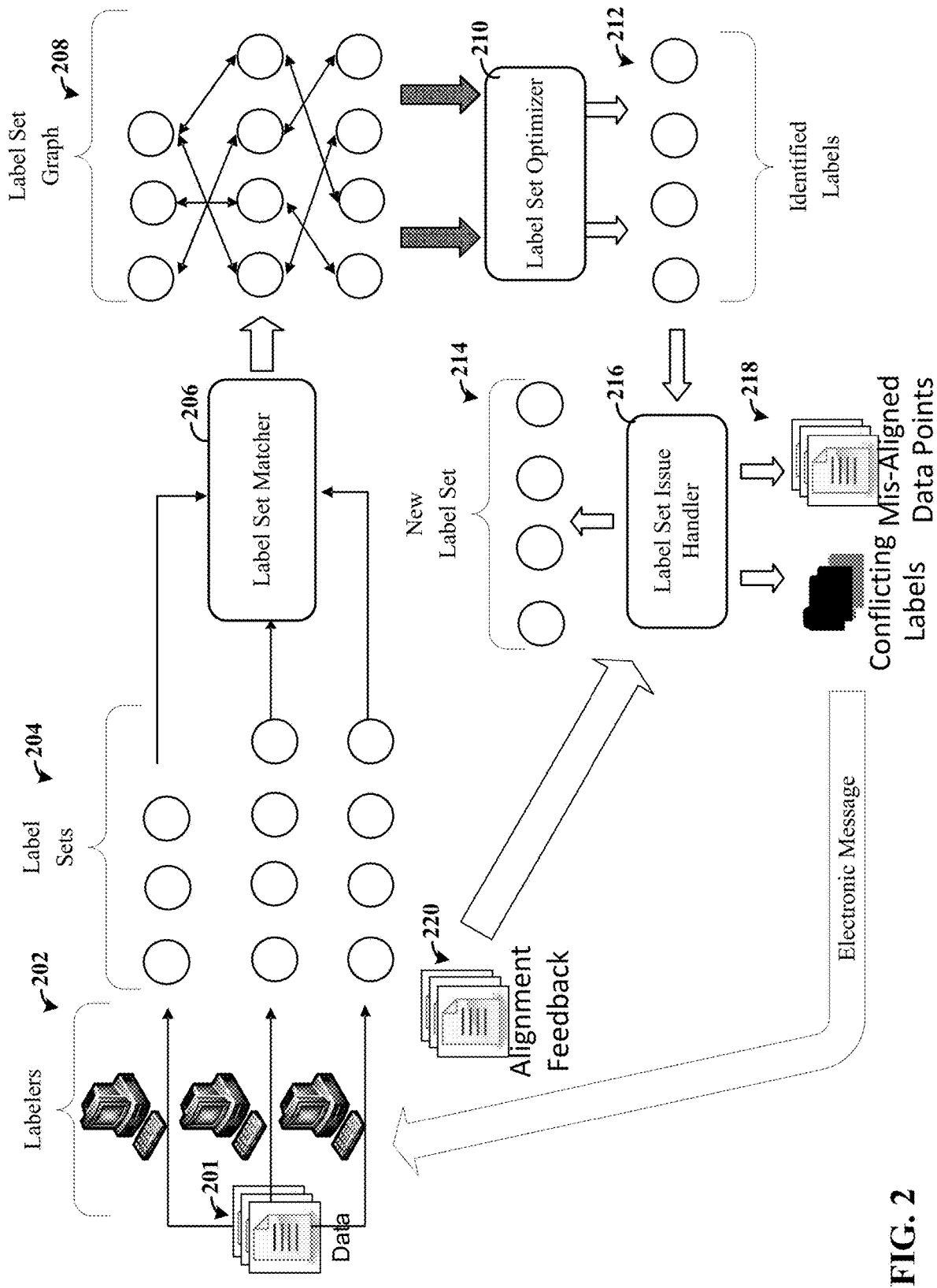
FIG. 2 depicts a flow diagram for generating a label set from multiple label sets, consistent with embodiments of the present disclosure.

FIG. 2 depicts a flow diagram for a system of generating a label set from multiple label sets, consistent with embodiments of the present disclosure. Labelers/entities 202 can review a corpus of data 201 for the purpose of classifying data points from the corpus using label sets 204. Label set matcher module 206 can be configured to generate a label set graph 208 from the label sets 204. Consistent with embodiments, the label set graph can include edges between the labels in each of the label sets 204. In certain embodiments, the label set graph 208 can be a multipartite graph. In particular embodiments, the label set graph 208 can be a complete multipartite graph, although it is possible to leave out one or more edges (e.g., between label sets with no common data points).

According to embodiments of the present disclosure, edge weights can be applied to the edges in the label set graph 208. For instance, the label set matcher module 206 can assign values that are derived from the number of common data points between labels. In some instances, the weights can be directly proportional the shared number. In other instances, the edge weights can be calculated using a more complex function. For instance, the edge weights can be determined based upon a percentage of similar data points that match. Different data points (or types of data points) might also be identified as having more or less importance to the edge weights.

Label set optimizer module 210 can be configured to match and identify labels from the different label sets based upon the edge weights. For example, the label set optimizer module 210 can be configured to select edges with higher weights. The selection algorithm can be constrained to grouping labels such that no label is in multiple groups. The edge weights for the edges between the labels in each group can be used to assess the viability of the proposed grouping. For each group, one of the labels can then be selected for use as the group label. For instance, the label can be selected based upon the values for directly-connected edge weights to all other labels within the group.

The identified labels 212 can then be analyzed by label set issue handler 216 in order to identify conflicting labels or misaligned data points 218. For instance, conflicting labels can include selected labels that include one or more of the same data points and misaligned data points can include data points that are not classified by any of the selected labels. Label set issue handler 216 can then generate an electronic message that is transmitted to the labelers 202.

Labelers 202 can generate and provide alignment feedback 220, which can specify potential solutions for the conflicting labels or misaligned data points 218. For example, the alignment feedback might identify an existing or additional label for placement of either misaligned data points or data points that are the cause of conflicting labels. Label set issue handler 216 can use the feedback to generate a new label set 214. This new label set can then be provided for use in training a machine learning algorithm.

Figure 3:
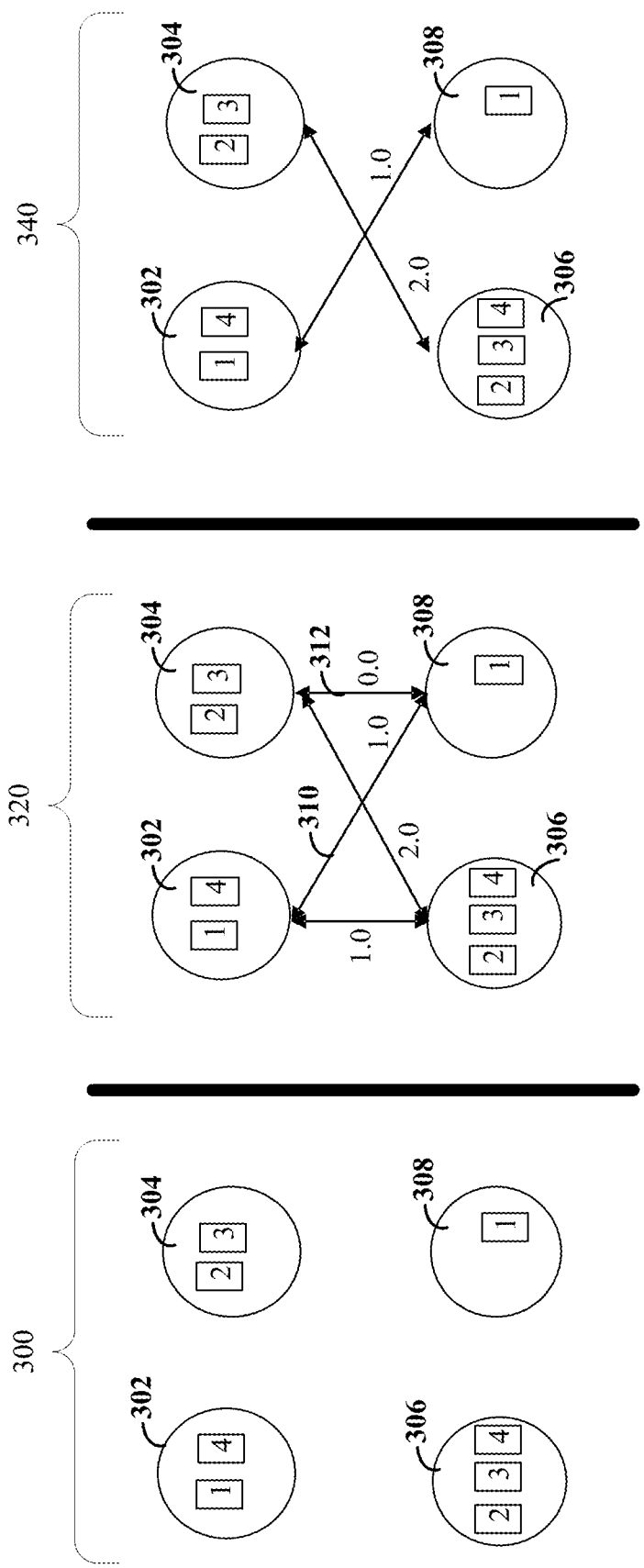
FIG. 3 depicts edge weights and resulting selections for a label set graph, consistent with embodiments of the present disclosure.

FIG. 3 depicts edge weights and resulting selection for a label set graph, consistent with embodiments of the present disclosure. Label sets 300 include two label sets, a first including labels 302 and 304 and a second including labels 306 and 308. For simplicity only two label sets, with two labels each and four data points, are depicted; however, the various embodiments discussed herein can include many more labels, label sets and data points.

Graph 320 includes edges between the labels in the label sets. These edges have weights assigned that correspond to the number of data points in common between the labels connected by the associated edge. For example, edge 310 has a weight of one because the data point "1" is the only data point common between labels 302 and 308. Edge 312 has a weight of zero because there are no common data points between labels 304 and 308.

Graph 340 shows the result of grouping the labels according to their edge weights. Edges with weights of two and one were selected such that labels 302 and 308 were grouped and labels 304 and 306 were grouped. In this particular example, data point "4" results in a conflict between the selected groups because it is in both groups. Consistent with embodiments, the proposed labels and groupings can be provided to the labelers along with an express identification of the problem associated with the classification of data point "4". Based upon input from the labelers, one or more of the selected labels can be modified or a new label can be generated.

Figure 4:
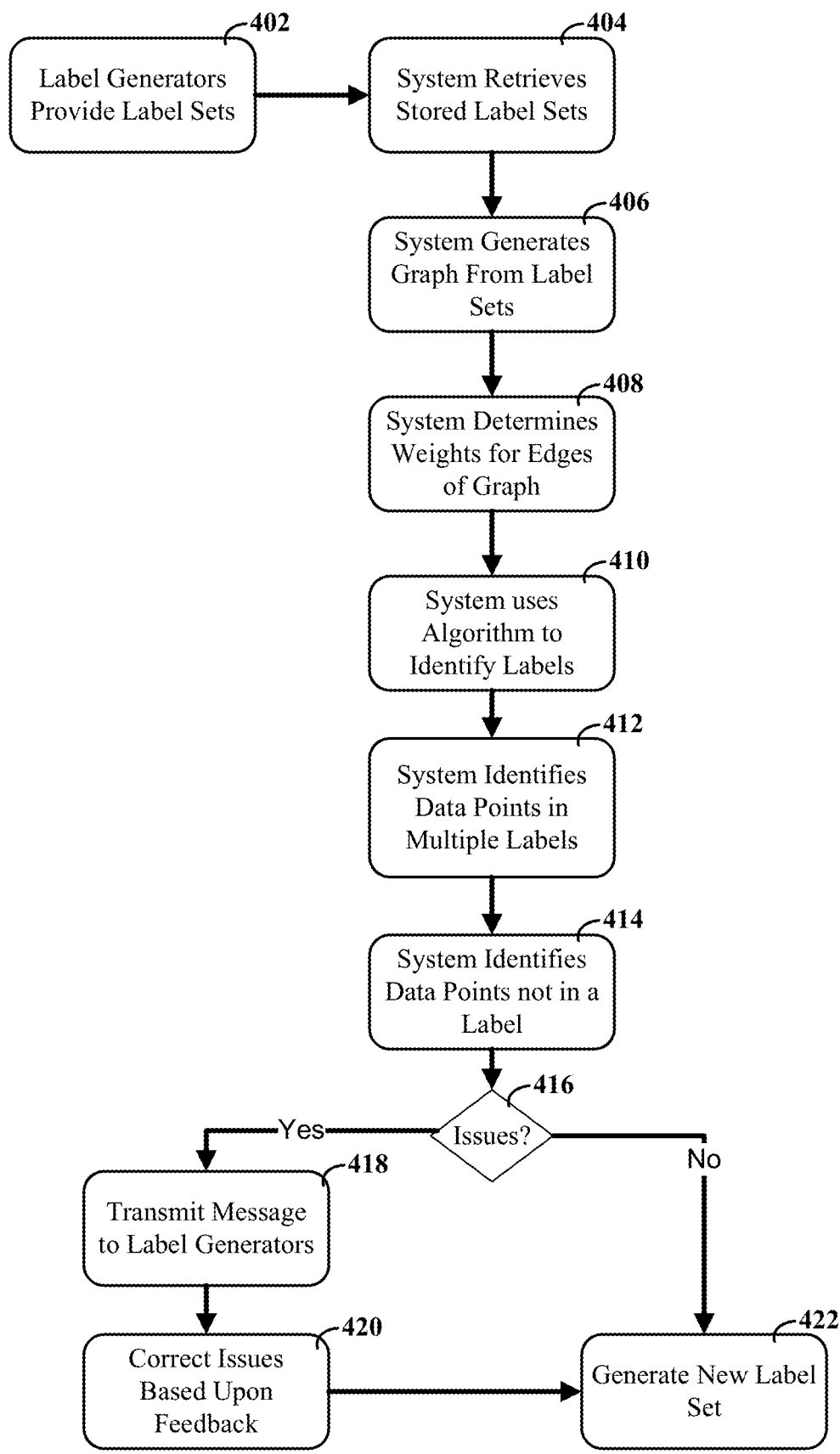
FIG. 4 depicts a flow diagram for generating a label set from a plurality of label sets using a computer system, consistent with embodiments of the present disclosure.

FIG. 4 depicts a flow diagram for generating a label set from a plurality of label sets using a computer system, consistent with embodiments of the present disclosure. Block 402 depicts that a set of label generating entities can create and provide label sets to a computer system, such as the computer systems discussed in connection with the various figures herein. The computer system can receive and store the label sets, per block 404.

One or more modules of the computer system can then generation a graph having edges that connect the labels in the different label sets, per block 406. For instance, the computer system can be configured to generate a complete multipartite graph from the label sets. The computer system can also generate edge weights for the graph, per block 408. These edge weights can be generated based upon the number of data points common between two labels connected by the corresponding edge.

Labels can then be grouped and identified based upon the edge weights, as shown by block 410. For example, the computer system could be configured to apply a hill climbing optimization algorithm, or other iterative algorithm, that attempts to maximize the edge weights. The computer system can then identify potential issues by checking for data points in more than one grouping of labels (block 412) or for data points not in any selected label (block 414). If no issues are found, per decision block 416, then a new label set can be generated using the selected labels (block 422). If issues are found, per decision block 416, then the computer system can be configured to generate and transmit an electronic message to the label generating entities, per block 418. The system can then receive feedback regarding the issues and make changes or corrections to the selected labels, per block 420. The resulting new label set 422 can then be provided for use in training a machine learning algorithm.

Figure 5:
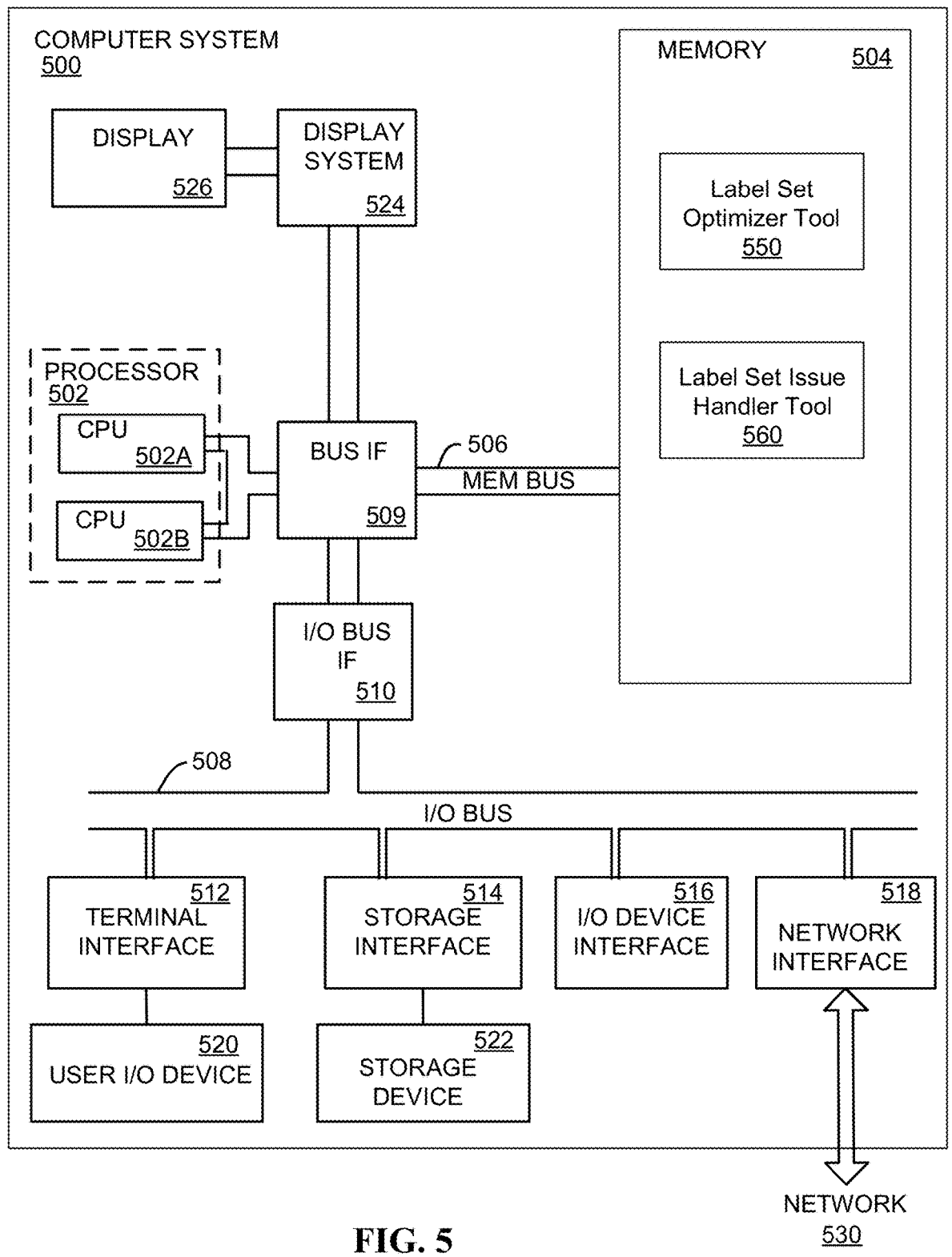
FIG. 5 depicts a high-level block diagram of a computer system 500 consistent with various embodiments of the present disclosure.

FIG. 5 depicts a high-level block diagram of a computer system 500 consistent with various embodiments of the present disclosure. The mechanisms and apparatus of the various embodiments disclosed herein apply equally to any appropriate computing system. The major components of the computer system 500 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions stored in the memory 504 and may include one or more levels of on-board cache.

In embodiments, the memory 504 may include a random-access semiconductor memory, storage device, or storage medium (either volatile or non-volatile) for storing or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store label set optimizer tool or module 550 and/or label set issue handler tool or module 560. Consistent with certain embodiments, these tools can be implemented as part of one or more monitor threads. These programs and data structures are illustrated as being included within the memory 504 in the computer system 500, however, in other embodiments, some or all of them may be on different computer systems and may be accessed remotely, e.g., via a network. The computer system 500 may use virtual addressing mechanisms that allow the programs of the computer system 500 to behave as if they only have access to a large, single storage entity instead of access to multiple, smaller storage entities. Thus, while the label set optimizer tool 550 and the label set issue handler tool 560 are illustrated as being included within the memory 504, these components are not necessarily all completely contained in the same storage device at the same time. Further, although the label set optimizer tool 550 and the label set issue handler tool 560 are illustrated as being separate entities, in other embodiments some of them, portions of some of them, or all of them may be packaged together (e.g., as part of the same monitor thread).

In embodiments, the label set optimizer tool 550 and the label set issue handler tool 560 may include instructions or statements that execute on the processor 502 or instructions or statements that are interpreted by instructions or statements that execute on the processor 502 to carry out the functions as further described below. In certain embodiments, the label set optimizer tool 550 and the label set issue handler tool 560 can be implemented in hardware via semiconductor devices, chips, logical gates, circuits, circuit cards, and/or other physical hardware devices in lieu of, or in addition to, a processor-based system. In embodiments, the label set optimizer tool 550 and the label set issue handler tool 560 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 5 depicts a representative of certain major components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for generating labels for machine learning algorithms, the method comprising:
    retrieving, from a data storage circuit, multiple label sets that contain labels that each classify data points in a corpus of data;
    generating a graph that includes a plurality of edges, each edge between two respective labels from different label sets of the multiple label sets;
    determining weights for the plurality of edges based upon a consistency between the data points classified by two labels connected by the edges;
    applying an algorithm that creates grouped labels from the multiple label sets and based upon the weights for the plurality of edges;
    identifying data points from the corpus of data that represent conflicts within the grouped labels; and
    presenting the identified data points to entities for further classification.

2. The method of claim 1, further comprising receiving further classification of the multiple label sets from the entities.

3. The method of claim 2, generating a new label set based upon the grouped labels and the further classification received from the entities.

4. A computer system for generating labels for machine learning algorithms, the computer system comprising:
    at least one processor circuit and computer readable storage device that are configured to include:
        a label set comparison module configured to:
            retrieve, from a data storage circuit, multiple label sets that contain labels that each classify data points in a corpus of data;
            generate a graph that includes a plurality of edges, each edge between two respective labels from different label sets of the multiple label sets;
            determine weights for the plurality of edges based upon a consistency between data points classified by two labels connected by the edges;
        a label set coordinator module configured to:
            apply an algorithm that creates grouped labels from the multiple label sets and based upon the weights for the plurality of edges; and
            identify data points from the corpus of data that represent conflicts within the grouped labels; and
        a label set issue handler module configured to:
            present the identified data points to entities for further classification.

5. The system of claim 4, the label set issue handler module further configured to receive further classification of the multiple label sets from the entities.

6. The system of claim 4, the label set issue handler module further configured to generate a new label set based upon the grouped labels and the further classification received from the entities.

7. A computer program product comprising a computer readable storage medium having program instructions embodied therewith, the program instructions executable by a computer to cause the computer to perform a method comprising:
    retrieving, from a data storage circuit, multiple label sets that contain labels that each classify data points in a corpus of data;
    generating a graph that includes a plurality of edges, each edge between two respective labels from different label sets of the multiple label sets;
    determining weights for the plurality of edges based upon a consistency between the data points classified by two labels connected by the edges;
    applying an algorithm that creates grouped labels from the multiple label sets and based upon the weights for the plurality of edges;
    identifying data points from the corpus of data that represent conflicts within the grouped labels;
    presenting the identified data points to entities for further classification.

* * * * *